(12) United States Patent
Liao et al.

(10) Patent No.: US 10,451,788 B2
(45) Date of Patent: Oct. 22, 2019

(54) FRONT LIGHT MODULE AND DISPLAY MODULE

(71) Applicant: E Ink Holdings Inc., Hsinchu (TW)

(72) Inventors: Ching-Huan Liao, Hsinchu (TW); Tsai-Wei Shei, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 301 days.

(21) Appl. No.: 15/183,790

(22) Filed: Jun. 16, 2016

(65) Prior Publication Data

US 2017/0082792 A1 Mar. 23, 2017

(30) Foreign Application Priority Data

Sep. 23, 2015 (TW) .............................. 104131364 A (51) Int. Cl.
*F21V 8/00* (2006.01)

(52) U.S. Cl.
CPC ......... *G02B 6/0013* (2013.01); *G02B 6/0068* (2013.01); *G02B 6/0076* (2013.01)

(58) Field of Classification Search
CPC ... G02B 6/0013; G02B 6/0076; G02B 6/0068
USPC ....................................................... 362/613
See application file for complete search history.

(56) References Cited

U.S. PATENT DOCUMENTS

| 7,350,958 | B2 | 4/2008 | Yang |
| 7,484,873 | B2 | 2/2009 | Dejima et al. |
| 7,484,879 | B2 * | 2/2009 | Hamilton, Jr. ........ B01F 7/0005 366/129 |
| 7,686,494 | B2 | 3/2010 | Song |
| 8,545,085 | B2 | 10/2013 | Wu et al. |
| 8,602,628 | B2 | 12/2013 | Mi et al. |

(Continued)

FOREIGN PATENT DOCUMENTS

| CN | 102819059 | 5/2015 |
| CN | 104832827 | 8/2015 |

(Continued)

OTHER PUBLICATIONS

"Office Action of Taiwan Counterpart Application", dated Sep. 6, 2016, p. 1-p. 7.

(Continued)

*Primary Examiner* — Anh T Mai
*Assistant Examiner* — Glenn D Zimmerman
(74) *Attorney, Agent, or Firm* — JCIPRNET (57) ABSTRACT

A front light module including a plurality of stacked transparent materials and a plurality of light sources is provided. The light sources are configured to provide light beams, and are disposed beside the light incident surface of the transparent materials. An edge portion is at a location of at least one of these transparent materials which is adjacent to the light sources. The edge portion includes a plurality of first sub-edges and a plurality of second sub-edges. The first sub-edges are disposed corresponding to the light sources. The first sub-edges and the second sub-edges are arranged alternately in a row, and one of the distances from the first sub-edges to the light entering surface is greater than one of the distances from the second sub-edges to the light entering surface. Furthermore, a display module is also provided.

20 Claims, 8 Drawing Sheets

(56) References Cited

U.S. PATENT DOCUMENTS

| | | | |
|---|---|---|---|
| 8,714,805 B2* | 5/2014 | Kim | G02B 6/002 349/65 |
| 8,882,326 B2 | 11/2014 | Kikuchi et al. | |
| 9,739,925 B2* | 8/2017 | Shih | G02B 6/0068 |
| 2008/0298084 A1* | 12/2008 | Yang | G02B 6/0036 362/607 |
| 2010/0157624 A1* | 6/2010 | Liao | G02B 6/0035 362/611 |
| 2012/0262413 A1* | 10/2012 | Huang | G06F 3/0488 345/174 |
| 2013/0148378 A1 | 6/2013 | Mi et al. | |
| 2013/0242610 A1* | 9/2013 | Ochi | G02B 6/0033 362/611 |
| 2013/0258705 A1* | 10/2013 | Pao | G02B 6/0023 362/603 |
| 2013/0300979 A1 | 11/2013 | Seo et al. | |
| 2013/0329452 A1 | 12/2013 | Mi | |
| 2013/0329453 A1 | 12/2013 | Mi | |
| 2013/0329455 A1 | 12/2013 | Mi | |
| 2013/0343082 A1 | 12/2013 | Kikuchi et al. | |
| 2014/0146568 A1 | 5/2014 | Liao | |
| 2015/0003104 A1* | 1/2015 | Huang | G02B 6/005 362/606 |
| 2015/0226898 A1* | 8/2015 | Shih | G02B 6/0068 362/608 |
| 2016/0131814 A1* | 5/2016 | Tai | G02B 6/0073 362/611 |
| 2016/0223734 A1* | 8/2016 | Hsu | G02B 6/0018 |

FOREIGN PATENT DOCUMENTS

| | | |
|---|---|---|
| KR | 20060028895 | 4/2006 |
| TW | 201531768 | 8/2015 |

OTHER PUBLICATIONS

Office Action of China Counterpart Application, dated Jun. 28, 2018, pp. 1-11.

* cited by examiner

FRONT LIGHT MODULE AND DISPLAY MODULE

CROSS-REFERENCE TO RELATED APPLICATION

This application claims the priority benefit of Taiwan application serial no. 104131364, filed on Sep. 23, 2015. The entirety of the above-mentioned patent application is hereby incorporated by reference herein and made a part of this specification.

BACKGROUND OF THE INVENTION

1. Field of the Invention

The invention relates to an optical module and a display module, and particularly relates to a front light module and a display module.

2. Description of Related Art

Generally, a reflective display having a front light module is designed to dispose the front light module above a display module, and dispose a light source at a side surface of a light guide plate (LGP). Thus, light emitted by the light source may travel in total internal reflection in the light guide plate. The total internal reflection is canceled by using microstructures, and the light is refracted toward the display module, so as to convert the light source into a surface light source with a uniform optical distribution. The light refracted toward the display module may then be reflected by the display module and transmitted to the viewer.

A conventional front light module of the reflective display includes a light source, a light guide plate, an optical clear adhesive (OCA), and an anti-glare film (AG film). The light guide plate is attached to the display module and the anti-glare film through the optical clear adhesive. Generally, the light source used in the front light module is a non-continuous light source, such as a plurality of light emitting diodes (LEDs) that are independently disposed. Since the light sources are in a discontinuous distribution, the reflective display may have uneven brightness at a light incident side, namely a hot spot phenomenon.

A conventional way to deal with the hot spot is to manufacture a microstructure (such as a serration microstructure) on the light incident surface of the light guide plate or adjust a screen dot density of the light guide plate. However, due to the decrease in the number of light sources and the increase in the display size in the applications of the reflective display, such method has its limitation. Besides, as the screen dot density of the light guide plate increases, the precision requirement on the alignment with respect of the light sources is consequently increased significantly. Thus, assembling properties of the reflective display are limited.

SUMMARY OF THE INVENTION

The embodiments of the invention provide a front light module allowing a portion of a surface light source close to a light incident surface to have a preferable uniformity of light intensity.

The embodiments of the invention provide a display module, where a display image thereof close to a light incident surface has a preferable uniformity of light intensity.

An embodiment of the invention provides a front light module including a plurality of stacked transparent materials and a plurality of light sources. The stacked transparent materials include a first surface, a second surface opposite to the first surface, and a light incident surface. The light sources disposed beside the light incident surface provide a plurality of light beams. An edge portion is at a location of at least one of the transparent materials that is adjacent to the light sources. The edge portion includes a plurality of first sub-edges and a plurality of second sub-edges. The light sources are disposed in correspondence with the first sub-edges, and the first sub-edges and the second sub-edges are alternately arranged in a row. In addition, one of distances from the first sub-edges to the light incident surface is greater than one of distances from the second sub-edges to the light incident surface.

According to an embodiment, the transparent materials include a first adhesive layer, a second adhesive layer, and a first light guide plate located between the first adhesive layer and the second adhesive layer. The first light guide plate has the light incident surface. At least one of the first adhesive layer and the second adhesive layer has the edge portion.

According to an embodiment of the invention, each of a refractive index of the first adhesive layer and a refractive index of the second adhesive layer is smaller than a refractive index of the first light guide plate.

According to an embodiment of the invention, materials of the first adhesive layer and the second adhesive layer include optical clear adhesive.

According to an embodiment, the transparent materials include a first adhesive layer, a second adhesive layer, and a first light guide plate located between the first adhesive layer and the second adhesive layer. The first light guide plate has a first portion and a second portion, and the refractive index of the first light guide plate is a gradient index (GRIN). One of the first portion and the second portion has the edge portion, and the other of the first portion and the second portion has the light incident surface.

According to an embodiment, the transparent materials include a first adhesive layer, a first light guide plate, a second light guide plate, and a second adhesive layer. A refractive index of the first light guide plate and a refractive index of the second light guide plate are substantially different from each other. The first light guide plate is located between the first adhesive layer and the second light guide plate. One of the first light guide plate and the second light guide plate has the edge portion, and the other of the first light guide plate and the second light guide plate has the light incident surface.

According to an embodiment of the invention, a shape of each of the first sub-edges is a V shape, a semi-circular shape, or a linear shape, and each of the second sub-edges is substantially parallel to the light incident surface.

According to an embodiment of the invention, the front light module further includes a functional layer, the functional layer is disposed on the first surface and is an anti-glare layer, a protection layer, or an anti-reflective layer.

According to an embodiment of the invention, an average of the distances from the first sub-edges to the light incident surface is greater than an average of the distances from the second sub-edges to the light incident surface.

According to an embodiment, the light sources are arranged beside the light incident surface along a line in an equidistant arrangement.

According to an embodiment of the invention, each of the light sources is aligned to one of the first sub-edges in a one-to-one relation.

An embodiment of the invention provides a display module, including a reflective display panel, a plurality of stacked transparent materials, and a plurality of light sources. The stacked transparent materials include a first surface, a second surface opposite to the first surface, and a light incident surface. In addition, the second surface faces toward the reflective display panel, and the first surface faces away from the reflective display panel. The light sources provide a plurality of light beams and are disposed beside the light incident surface. An edge portion is at a location of at least one of the transparent materials that is adjacent to the light sources. The edge portion includes a plurality of first sub-edges and a plurality of second sub-edges. The first sub-edges and the second sub-edges are alternately arranged in a row. In addition, one of distances from the first sub-edges to the light incident surface is greater than one of distances from the second sub-edges to the light incident surface.

According to an embodiment, the transparent materials include a first adhesive layer, a second adhesive layer, and a first light guide plate located between the first adhesive layer and the second adhesive layer. The first light guide plate has the light incident surface. At least one of the first adhesive layer and the second adhesive layer has the edge portion.

According to an embodiment of the invention, each of a refractive index of the first adhesive layer and a refractive index of the second adhesive layer is smaller than a refractive index of the first light guide plate.

According to an embodiment of the invention, materials of the first adhesive layer and the second adhesive layer include optical clear adhesive.

According to an embodiment, the transparent materials include a first adhesive layer, a second adhesive layer, and a first light guide plate located between the first adhesive layer and the second adhesive layer. The first light guide plate has a first portion and a second portion, and the refractive index of the first light guide plate is a gradient index (GRIN). One of the first portion and the second portion has the edge portion, and the other of the first portion and the second portion has the light incident surface.

According to an embodiment, the transparent materials further include a second light guide plate. A refractive index of the first light guide plate and a refractive index of the second light guide plate are substantially different from each other. The first light guide plate is located between the first adhesive layer and the second light guide plate. One of the first light guide plate and the second light guide plate has the edge portion, and the other of the first light guide plate and the second light guide plate has the light incident surface.

According to an embodiment of the invention, a shape of each of the first sub-edges is a V shape, a semi-circular shape, or a linear shape, and each of the second sub-edges is substantially parallel to the light incident surface.

According to an embodiment of the invention, the front light module further includes a functional layer, the functional layer is disposed on the first surface and is an anti-glare layer, a protection layer, or an anti-reflective layer.

According to an embodiment of the invention, an average of the distances from the first sub-edges to the light incident surface is greater than an average of the distances from the second sub-edges to the light incident surface.

Based on above, the front light module according to the embodiments of the invention reduces the phenomenon of hot spot by designing that the transparent materials have different refractive indices and the distances from the transparent materials to the light incident surface are different. Thus, a display image of the display module having the front light module according to the embodiments of the invention has a preferable uniformity of light intensity, and the display module has a preferable optical quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1A:
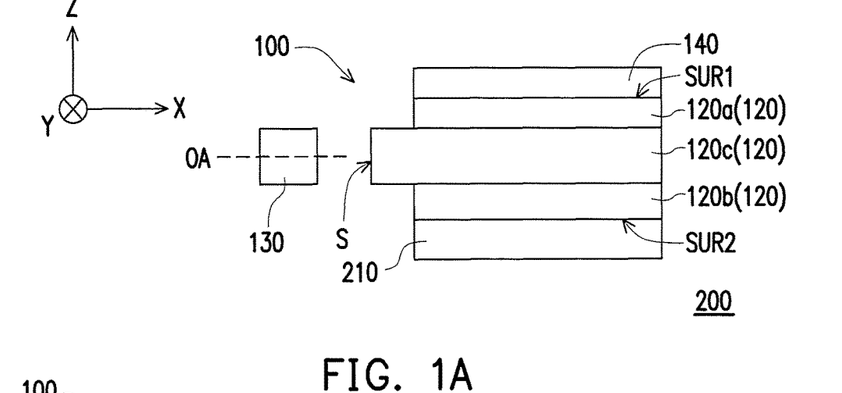
FIG. 1A is a schematic cross-sectional view illustrating an embodiment of the invention.
Figure 1B:
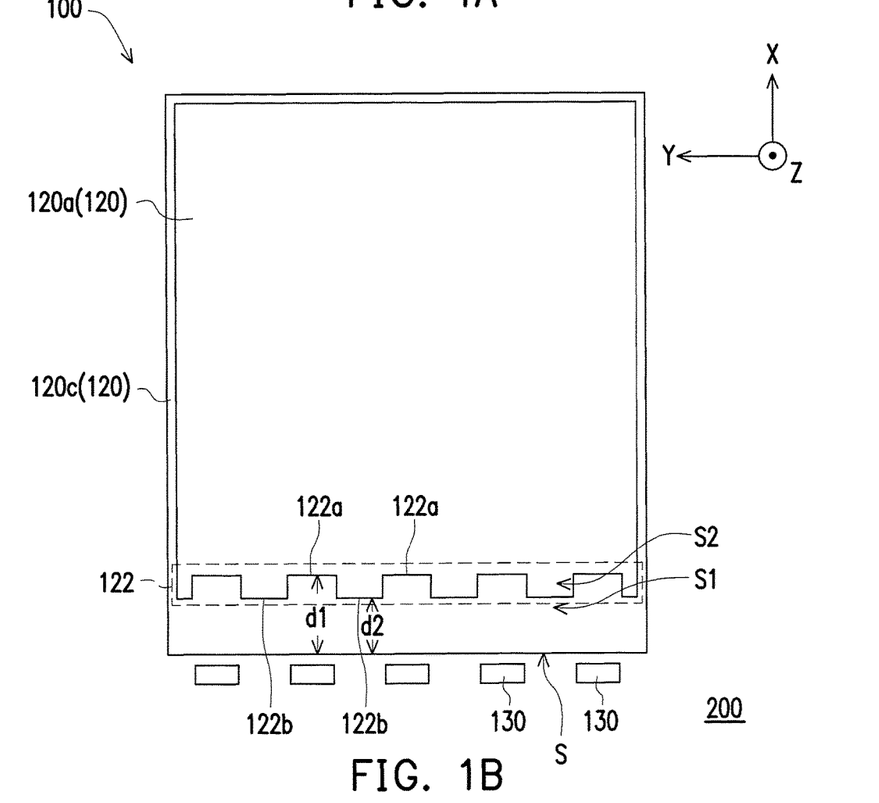
FIG. 1B is a schematic top view illustrating the embodiment shown in FIG. 1A.
Figure 1C:
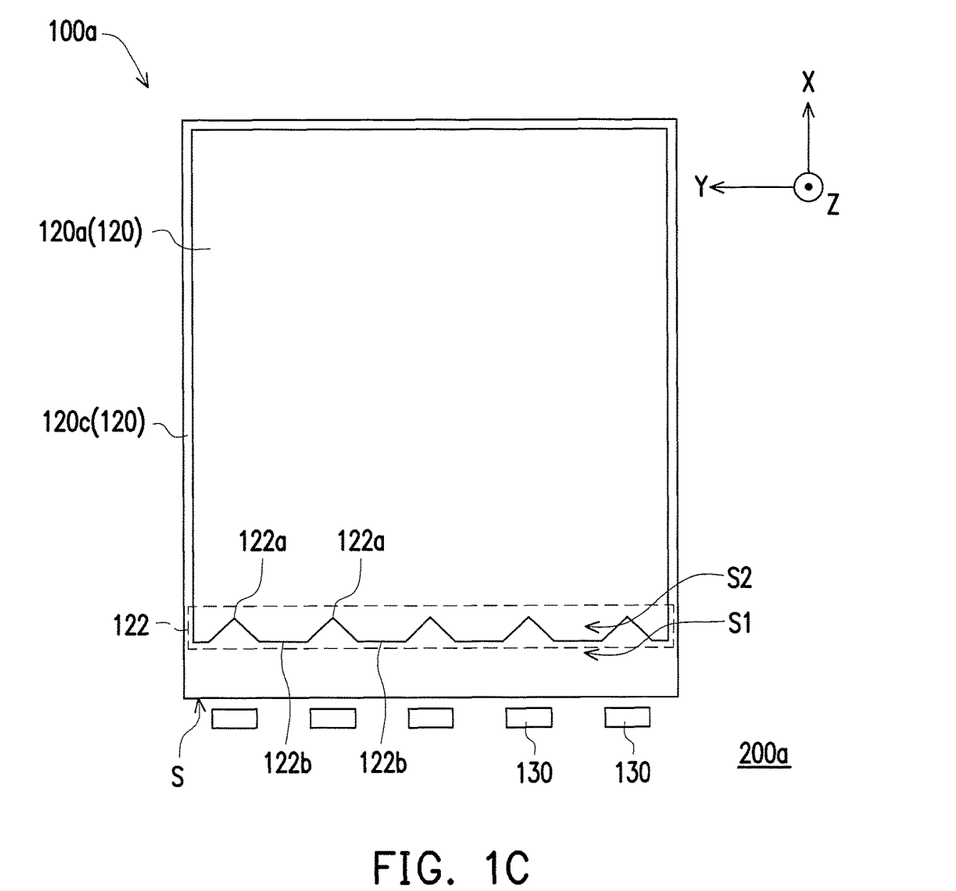
FIGS. 1C and 1D are schematic top views illustrating different embodiments of the invention.
Figure 1D:
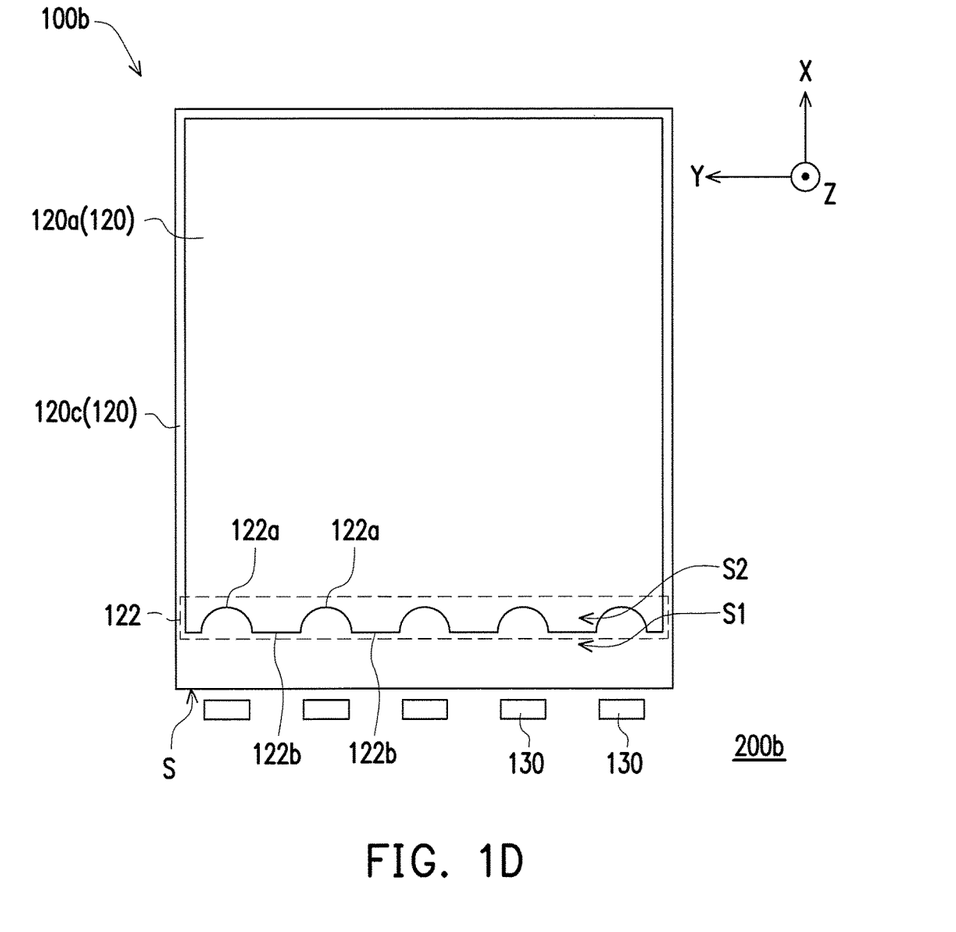

FIGS. 1A and 1B are respectively schematic cross-sectional view and schematic top view illustrating a display module of an embodiment of the invention. FIGS. 1C and 1D are respectively schematic top views illustrating display modules of different embodiments of the invention. It should be noted that, to more clearly illustrate an arrangement of the display module of this embodiment, illustration of a functional layer 140 is omitted in FIG. 1B.

To clearly describe the arrangement of a display module 200 of this embodiment, the display module 200 of this embodiment may be considered as being located in a space constructed by X-axis, Y-axis, and Z-axis. In addition, X-axis is in a direction substantially parallel to a direction of an optical axis OA of a plurality of light sources 130, and extends along a horizontal direction. Z-axis is in a direction perpendicular to the direction of X-axis and extends along a vertical direction. Also, Y-axis is in a direction perpendicular to the direction of X-axis as well as the direction of Z-axis.

Referring to FIGS. 1A and 1B together, the display module 200 includes a reflective display panel 210, a plurality of stacked transparent materials 120, and a plurality of light sources 130. The transparent materials 120 include a first surface SUR1, a second surface SUR2, and a light incident surface S. The second surface SUR2 is opposite to the first surface SUR1. More specifically, one of the first surface SUR1 and the second surface SUR2 of the transparent materials 120 faces toward the reflective display panel 210, and the other faces away from the reflective display panel 210. More specifically, the second surface SUR2 faces toward the reflective display panel 210, and the first surface SUR1 faces away from the reflective display panel 210. The light sources 130 provide a plurality of light beams and are disposed beside the light incident surface S. Specifically, the light sources 130 are arranged beside the light incident surface S along a line on Y-axis in an equidistant arrangement. In addition, an edge portion 122 is at a location of at least one of the transparent materials 120 that is adjacent to the light sources 130. The edge portion 122 includes a plurality of first sub-edges 122a and a plurality of second sub-edges 122b. The light sources 130 are disposed in correspondence with the first sub-edges 122a, and the first sub-edges 122a and the second sub-edges 122b are alternately arranged in a row along the direction of Y-axis. In addition, one of distances from the first sub-edges 122a to the light incident surface S is greater than one of distances from the second sub-edges 122b to the light incident surface S. More specifically, each of the light sources 130 is aligned to one of first sub-edges 122a in a one-to-one relation.

It should be noted that the transparent materials 120 and the light sources 130 may be considered as the front light module 100. In addition, the front light module 100 projects a plurality of light beams provided by the light sources 130 onto the reflective display panel 210. In addition, after the light beams are reflected by a surface of the reflective display panel 210, an image of the reflective display panel 210 is displayed. In other words, the display module 200 of this embodiment includes the front light module 100 and the reflective display panel 210.

Specifically, the front light module 100 further includes a functional layer 140 disposed on the first surface SUR1. In this embodiment, the functional layer 140 may be an anti-glare layer having an anti-glare function. Since the anti-glare layer is a film capable of reducing a surface reflectivity, reflection of an external light source at the front light module 100 may be reduced. Also, the anti-glare layer also offers a function of scattering the external light source. Accordingly, when the user views the image displayed by the reflective display panel 210 through the front light module 100, there is no glare due to the reflection of the external light source. The light interference to the user's viewing is thus reduced, so as to prevent a reduced display quality of the display module 200 due to the glare to the user's eye. In other embodiments, the functional layer 140 may also be a protection layer that is subjected to a surface hard coating treatment or an anti-reflection layer that is subjected to an anti-reflection treatment. The invention is not limited by the function of the functional layer 140.

In addition, the light sources 130 may be light emitting diodes (LEDs). In addition, the light beams emitted by the respective LEDs may be light beams in different wavelength ranges, such as red light, green light, blue light, or white light, etc. In other embodiments, the light sources 130 may also be organic light emitting diodes (OLEDs) or other components suitable for light emission. Also, in this embodiment, the number of the light emitting diodes may be 5, for example. However, the invention is not limited by the number and types of the light sources and wavelengths of light emitted by the light sources.

In this embodiment, the transparent materials 120 include a first adhesive layer 120a, a first light guide plate 120c, and a second adhesive layer 120b. The first light guide plate 120c has the light incident surface S. In addition, the first light guide plate 120c is located between the first adhesive layer 120a and the second adhesive layer 120b, and at least one of the first adhesive layer 120a and the second adhesive layer 120b has the edge portion 122. In this embodiment, the first adhesive layer 120a has the edge portion 122 and the second adhesive layer 120b does not have the edge portion 122, for example. In an embodiment, the first adhesive layer 120a and the second adhesive layer 120b may have the edge portion 122 at the same time. In another embodiment, the second adhesive layer 120b has the edge portion 122, while the first adhesive layer 120a does not have the edge portion 122. However, the invention is not limited thereto. It should be noted that, not having the edge portion 122 as described herein means that a distance from a position of the adhesive layer (the first adhesive layer 120a or the second adhesive layer 120b) adjacent to the light incident surface S to the light incident surface S does not change along the direction of Y-axis.

Referring to FIGS. 1A and 1B again, it should be noted that, in this embodiment, at least one of the first adhesive layer 120a and the second adhesive layer 120b has the edge portion 122, the first sub-edges 122a and the second sub-edges 122b are in a linear shape, as shown in FIG. 1B, and the first sub-edges 122a and the second sub-edges 122b are substantially parallel to an edge of the light incident surface S. More specifically, the second sub-edges 122b have a first side S1 and a second side S2 opposite to the first side S1. In addition, the light sources 130 are located at the first side S1, and the first sub-edges 122a are located at the second side S2. Thus, with an indent design of the first sub-edges 122a in this embodiment, one of the distances from the first sub-edges 122a to the light incident surface S is greater than one of the distances from the second sub-edges 122b to the light incident surface S. In another embodiment, an average of the distances from the first sub-edges 122a to the light incident surface S is greater than an average of the distances from the second sub-edges 122b to the light incident surface S.

Then, referring to FIG. 1C, a display module 200a shown in the schematic top view of FIG. 1C is similar to the display module 200 shown in the schematic top view of FIG. 1B, except for a main difference that shapes of the first sub-edges 122a shown in FIG. 1C are a V shape. Also, referring to FIG. 1D, a display module 200b shown in the schematic top view of FIG. 1D is similar to the display module 200 shown in the schematic top view of FIG. 1B, except for a main difference that shape of the first sub-edges 122a shown in FIG. 1C is a semi-circular shape. In other words, in the different embodiments shown above, one of the distances from the first sub-edges 122a to the light incident surface S is set to be greater than one of the distances from the second sub-edges 122b to the light incident surface S by designing the first sub-edges 122a to have various shapes. In another embodiment, the average of the distances from the first sub-edges 122a having various shapes to the light incident surface S is greater than the average of the distances from the second sub-edges 122b to the light incident surface S. It should be noted that the invention is not limited by the shapes of the first sub-edges 122a, as long as one of the distances from the first sub-edges 122a to the light incident surface S is greater than one of the distances from the second sub-edges 122b to the light incident surface S, or the average of the distances from the first sub-edges 122a to the light incident surface S is greater than the average of the second sub-edges 122b to the light incident surface S. These variations all fall into the scope of the invention.

Referring to FIGS. 1A and 1B again, in this embodiment, each of a refractive index of the first adhesive layer 120a and a refractive index of the second adhesive layer 120b is smaller than a refractive index of the first light guide plate 120c. Materials of the first adhesive layer 120a and the second adhesive layer 120b include optical clear adhesive (OCA). The first light guide plate 120c may be formed of a material that allows visible light to pass through, such as polymethylmethacrylate (PMMA) or polycarbonate. It should be noted that, in this embodiment, the refractive index of the first light guide plate 120c is a constant value. In other words, the refractive index of the first light guide plate 120c does not change as positions differ, and the corresponding refractive indices in different positions of the first light guide plate 120c are substantially the same.

Specifically, in this embodiment, each of refractive indices of media disposed at opposite surfaces of the first light guide plate 120c is smaller than the refractive index of the first light guide plate 120c. More specifically, the media disposed at the opposite surfaces of the first light guide plate 120c in this embodiment are respectively air and the first adhesive layer 120a, and air and the second adhesive layer 120b. Based on fundamental optical principles, when the light beams provided by the light sources 130 are coupled to the first light guide plate 120c, if the incident light beams that are coupled to the first light guide plate 120c ("the incident light beams" hereinafter) have an incident angle greater than a critical angle of the first light guide plate 120c with respect to the correspondingly disposed medium, the incident light beams may travel in total internal reflection (TIR) in the first light guide plate 120c according to the optical principle that the incident angle is equal to the reflection angle. If the incident light beams have an incident angle smaller than the critical angle of the first light guide plate 120c with respect to the correspondingly disposed medium, a portion of the incident light beams are refracted from the first light guide plate 120c to the reflective display panel 210 to make the reflective display panel 210 display an image. It can be known that, if the critical angle of the first light guide plate 120c with respect to the correspondingly disposed medium is greater, a higher proportion of the incident light beams are refracted to the reflective display panel 210. Also, if the critical angle of the first light guide plate 120c with respect to the correspondingly disposed medium is smaller, a lower proportion of the incident light beams are refracted to the reflective display panel 210.

Accordingly, in this embodiment, the material of the first light guide plate 120c is polymethylmethacrylate, for example. In addition, the refractive index of polymethylmethacrylate is about 1.49, and the critical angle of the total internal reflection with respect to air is about 42.2 degrees. Besides, since each of the refractive indices of the first adhesive layer 120a and the second adhesive layer 120b is greater than the refractive index of air, the critical angle of the total internal reflection of the first light guide plate 120c with respect to the first adhesive layer 120a or the second adhesive layer 120b is greater than 42.2 degrees. When the incident light beams provided by the light sources 130 are coupled to the first light guide plate 120 through the light incident surface S of the first light guide plate 120c, a distance for a portion of the incident light beams provided by the light sources 130 to travel to the first sub-edges 122a through the light incident surface S is greater than a distance for another portion of the incident light beams provided by the light sources 130 to the second sub-edges 122b through the light incident surface S. Thus, compared with the light incident beams that travel from the light incident surface S of the first light guide plate 120c to the second sub-edges 122b, a lower proportion of the incident light beams that travel from the light incident surface S of the first light guide plate 120c to the first sub-edges 122a are refracted to the reflective display panel 210, while a higher proportion of the light incident beams that travel from the tight incident surface S of the first light guide plate 120c to the second sub-edges 122b are refracted to the reflective display panel 210. It should be noted that the light sources 130 are disposed in correspondence with the first sub-edges 122a. Normally, the light incident surface S of the first light guide plate 120c corresponding to the first sub-edges 122a is brighter, while the light incident surface S of the first light guide plate 120c corresponding to the second sub-edges 122b is less bright. More specifically, the light incident surface S of the first light guide plate 120c corresponding to the first sub-edges 122a is brighter, but a lower proportion of the incident light beams that travel from the light incident surface S of the first light guide plate 120c to the first sub-edges 122a are refracted to the reflective display panel 210 as compared to that of the incident light beams that travel from the light incident surface S of the first light guide plate 120c to the second sub-edges 122b. Also, the light incident surface S of the first light guide plate 120c corresponding to the second sub-edges 122b is less bright, but a higher proportion of the incident light beams that travel from the light incident surface S of the first light guide plate 120c to the second sub-edges 122b are refracted to the reflective display panel 210 as compared to that of the incident light beams that travel from the light incident surface S of the first light guide plate 120c to the first sub-edges 122a. With such arrangement, a uniformity of light intensity of the display panel 200 adjacent to the light incident surface S may be improved. Based on above, by designing the distance from the edge portion 122 of the first adhesive layer 120a or the edge portion of the second adhesive layer 120b to the light incident surface S, the uniformity of the light intensity of the reflective display panel 210 adjacent to the light incident surface S in this embodiment may be effectively improved. In other words, with the arrangement, a phenomenon of hot spot of the reflective display panel 210 adjacent to the light incident surface S may be effectively reduced. Namely, a display image of the display module 200 having the front light module 100 according to the embodiment of the invention has a preferable uniformity of light intensity. Thus, the display module 200 may have a preferable optical quality.

Figure 2A:
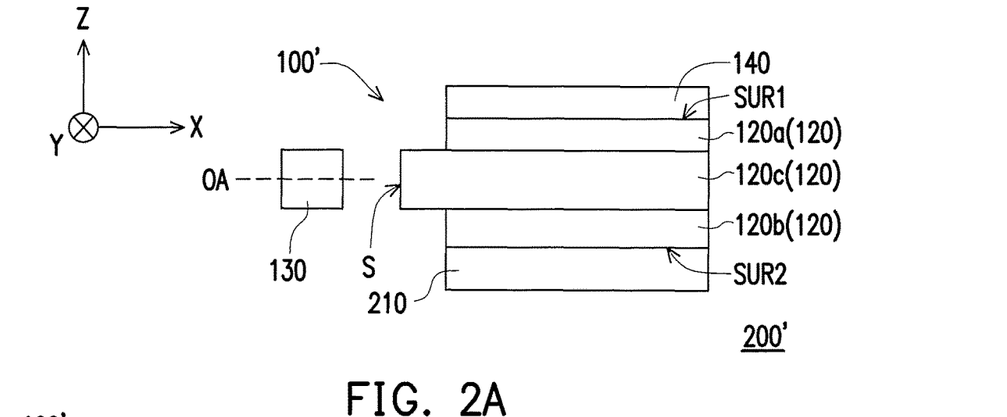
FIG. 2A is a schematic cross-sectional view illustrating a comparative embodiment of the invention.
Figure 2B:
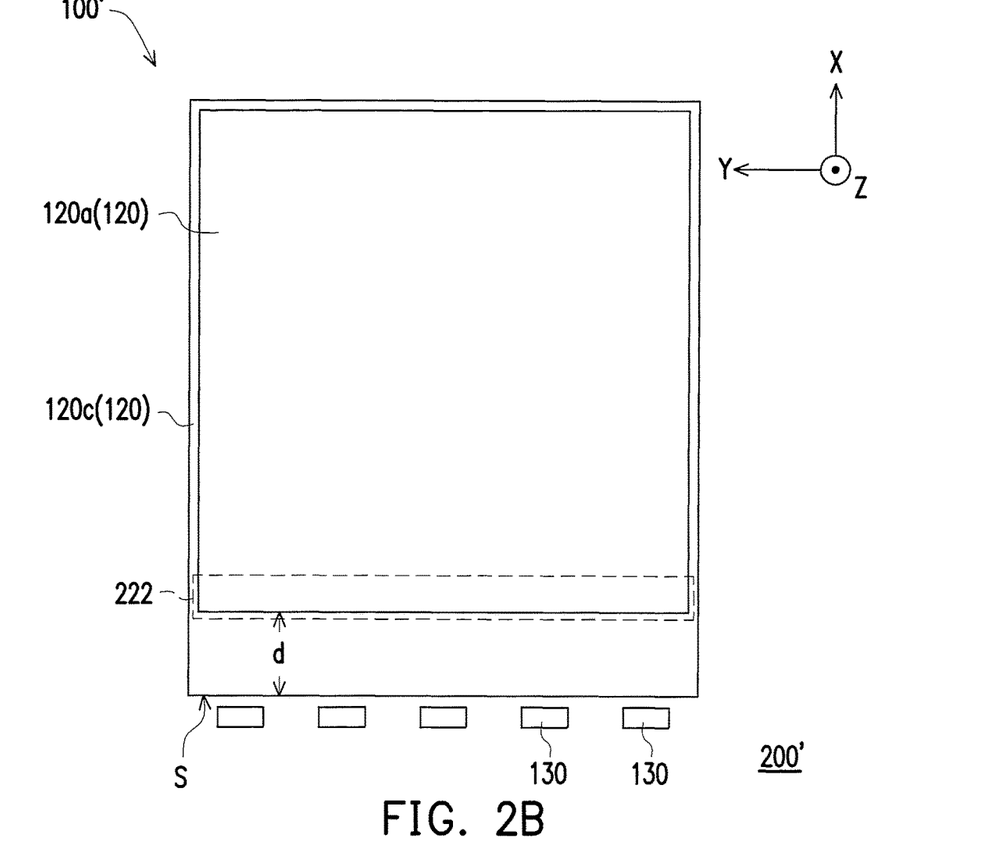
FIG. 2B is a schematic top view illustrating the comparative embodiment shown in FIG. 2A.
Figure 2C:
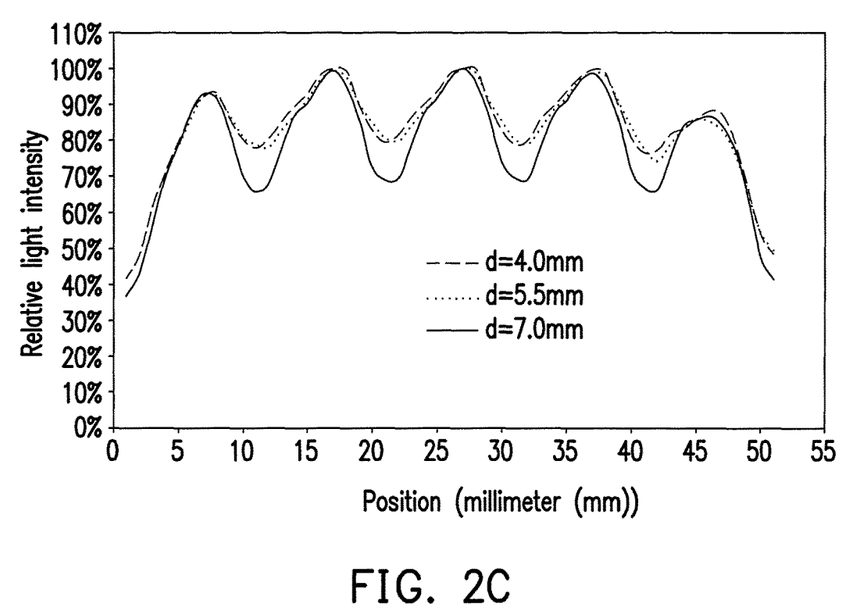
FIG. 2C is a diagram illustrating a simulated relation between a Y-axis position and a relative light intensity in a reflective display panel in a display module of the comparative embodiment shown in FIGS. 2A and 2B.
Figure 2D:
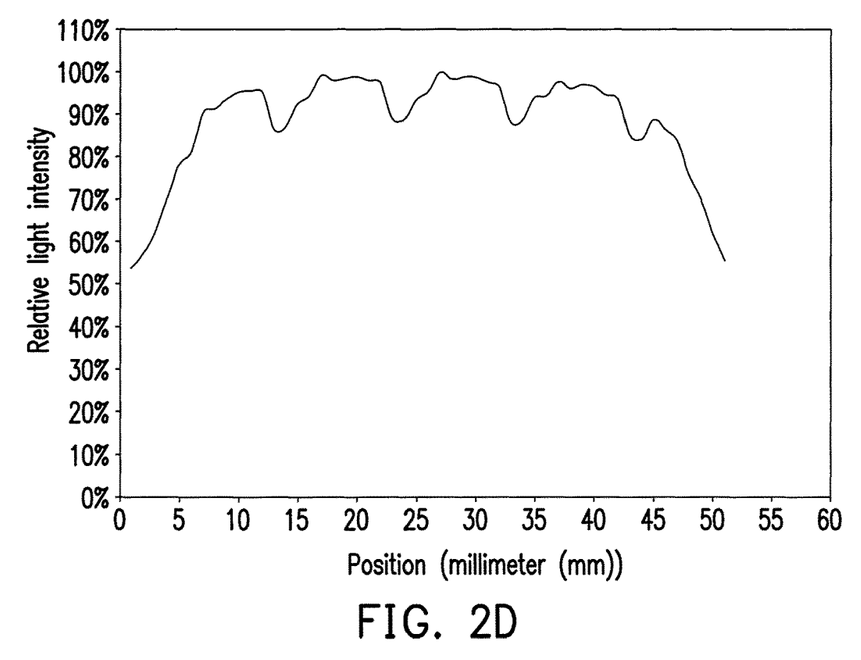
FIG. 2D is a diagram illustrating a simulated relation between a Y-axis position and a relative light intensity of a reflective display panel of a display module shown in FIGS. 1A and 1B.

FIGS. 2A and 2B are respectively schematic cross-sectional view and schematic top view illustrating a display module of a comparative embodiment of the invention. FIG. 2C is a diagram illustrating a simulated relation between a Y-axis position and a relative light intensity in a reflective display panel in the display module of the comparative embodiment of the invention. FIG. 2D is a diagram illustrating a simulated relation between a Y-axis position and a relative light intensity of the reflective display panel of the display module shown in FIGS. 1A and 1B. It should be noted that, to more clearly illustrate an arrangement of the display module of this embodiment, illustration of the functional layer 140 is omitted in FIG. 2B.

To more clearly illustrate the effect of the display module 200 shown in FIGS. 1A and 1B according to the embodiment of the invention, the comparative embodiment is provided herein to be compared with the display module 200 shown in FIGS. 1A and 1B according to the embodiment of the invention. Referring to FIGS. 2A and 2B together, a display module 200' shown in the schematic top view of FIGS. 2A and 2B is similar to the display module 200 shown in the schematic top view of FIG. 1B, except for a main difference that an edge portion 222 of the first adhesive layer 120a or the edge portion 222 of the second adhesive layer 120b is shown as a line.

Referring to FIG. 2C, a horizontal axis of FIG. 2C represents a corresponding position of the reflective display panel adjacent to the light incident surface S on Y-axis, and a measuring unit thereof is millimeter (mm), while a vertical axis of FIG. 2C represents a corresponding relative light intensity in different positions of the reflective display panel adjacent to the light incident surface S on Y-axis. In the comparative embodiment, each of the positions of the reflective display panel 210 adjacent to the light incident surface S that correspond to the light sources 130 on Y-axis is found to have a significant peak value. In this comparative embodiment, the number of the light sources 130 is 5, so FIG. 2C shows five significant peak values. To present the uniformity of light intensity of the reflective display panel 210 adjacent to the light incident surface S as numerical values, a modulation transfer function (MTF) is introduced herein. Namely, the uniformity of light intensity of the reflective display panel 210 adjacent to the light incident surface S is calculated as numerical values. The formula of MTF is provided as follows:

$$MTF = (T1-T2)/(T1+T2)*100\%$$

Here, T1 represents an average of maximal values of the peaks, and T2 represents an average of minimal values of valleys between the peaks. It should be noted that the greater the value obtained through calculation with the modulation transfer function, the less uniform the light intensity of the reflective display panel 210 adjacent to the light incident surface S becomes, and the lower the value obtained through calculation of the modulation transfer function, the more uniform the light intensity of the reflective display panel 210 adjacent to the light incident surface S becomes. Referring to FIG. 2C, FIG. 2C further illustrates a simulated relation between a Y-axis position in the reflective display panel in the display module 200' of the comparative embodiment of the invention and the relative light intensity with different distances d from the edge portion 122 of the first adhesive layer 120a or the edge portion 222 of the second adhesive layer 120b to the light incident surface S as a variable. Values of the modulation transfer function corresponding to the different distances d from the edge portion 122 of the first adhesive layer 120a or the edge portion 222 of the second adhesive layer 120b to the light incident surface S are provided in Table 1 as follows.

TABLE 1

| Distance d (millimeter (mm)) | MTF (%) |
|---|---|
| 4 | 12.3 |
| 5.5 | 12.5 |
| 7 | 20.7 |

Based on Table 1, it can be known that, within a certain range, reducing the distance from the edge portion 222 of the first adhesive layer 120a or the edge portion 222 of the second adhesive layer 120b to the light incident surface S may effectively reduce the corresponding value of the modulation transfer function significantly. However, such method still has its limitation. Namely, after the distance from the edge portion 222 to the light incident surface S is reduced to a certain extent, the reduction in the modulation transfer function becomes less significant. Referring to FIG. 2D, as comparison, a distance d1 from the first sub-edges 122a to the light incident surface S is 8 mm, while a distance d2 from the second sub-edges 122b to the light incident surface S is 3 mm in the display module 200 shown in FIGS. 1A and 1B. Through the variable calculation, it is known that the value of the modulation transfer function of the display module 200 of this embodiment is 7.3. In other words, compared with the display module 200' of the comparative embodiment, the display module 200 of the embodiment is capable of further effectively reducing the phenomenon of hot spot of the reflective display panel 210 adjacent to the light incident surface S.

It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 3A:
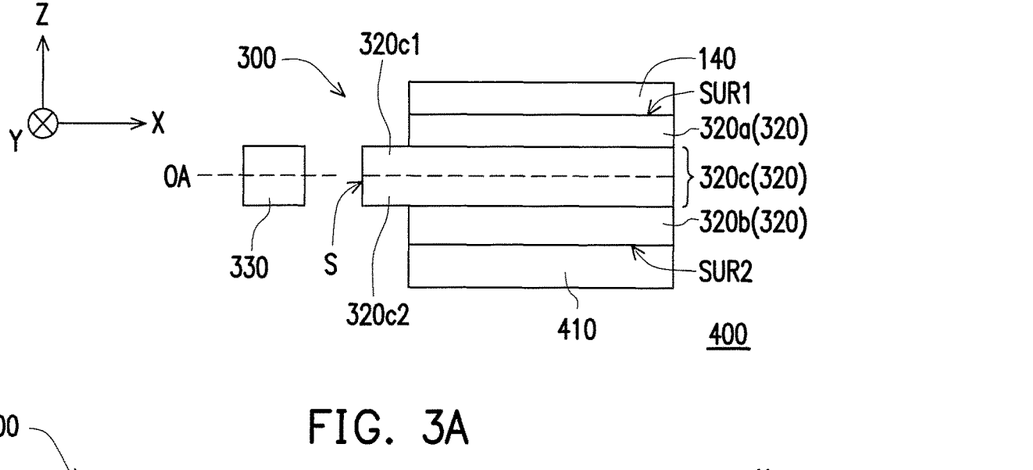
FIG. 3A is a cross-sectional schematic view illustrating another embodiment of the invention.
Figure 3B:
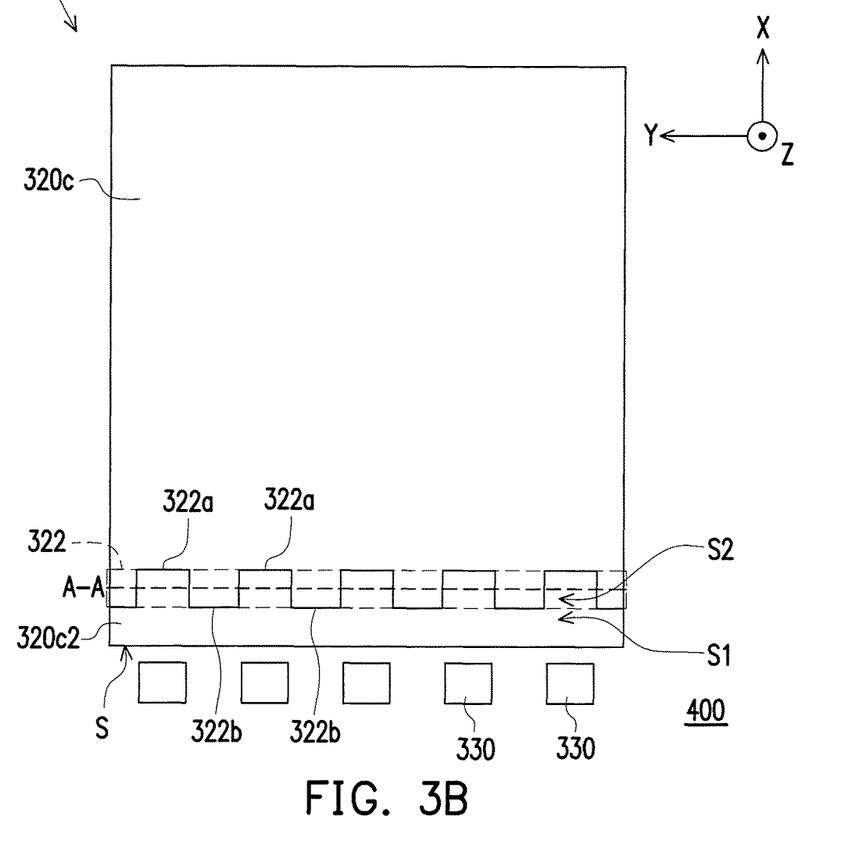
FIG. 3B is a schematic top view illustrating the embodiment shown in FIG. 3A.
Figure 3C:
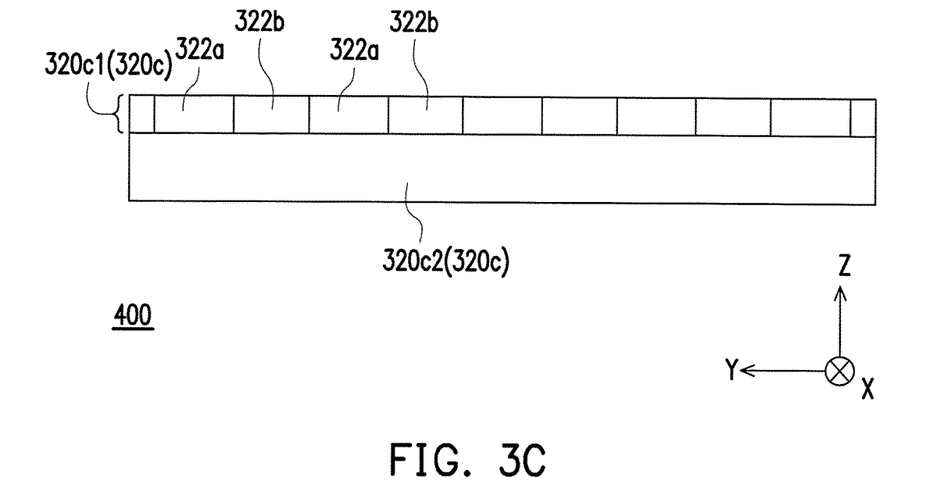
FIG. 3C is a schematic cross-sectional view illustrating the embodiment shown in FIGS. 3A and 3B along line A-A.

FIG. 3A is a schematic cross-sectional view illustrating a display module of another embodiment of the invention. FIG. 3B is a schematic top view illustrating the display module of another embodiment of the invention. FIG. 3C is a schematic cross-sectional view illustrating the display module of another embodiment of the invention along line A-A in FIG. 3B. It should be noted that, to more clearly illustrate an arrangement of respective components in a first light guide plate 320c, illustration of a first adhesive layer 320a, a second adhesive layer 320b, the functional layer 140, and a reflective display panel 410 is omitted in FIGS. 3B and 3C.

Referring to FIGS. 3A, 3B, and 3C together, a display module 400 shown in FIGS. 3A, 3B, and 3C are similar to the display module 200 shown in FIGS. 1A and 1B, except for a main difference that transparent materials 320 of the display module 400 shown in FIGS. 3A, 3B, and 3C include the first adhesive layer 320a, the first light guide plate 320c, and the second adhesive layer 320b, and the first light guide plate 320c has the edge portion 322, while the first adhesive layer 320a and the second adhesive layer 320b do not have the edge portion 322. Not having the edge portion 322 as described herein means that a distance from a position of the adhesive layer (the first adhesive layer 320a or the second adhesive layer 320b) adjacent to the light incident surface S to the light incident surface S does not change along the direction of Y-axis. Specifically, the first light guide plate 320c has a first portion 320c1 and a second portion 320c2. Also, a refractive index of the first light guide plate 320c is a gradient index (GRIN). In other words, the refractive index of the first light guide plate 320c changes as positions differ. In this embodiment, the refractive index of the first light guide plate 320c changes as coordinate positions on Z-axis vary. More specifically, the refractive index of the first light guide plate 320c gradually increases along the direction of Z-axis of the reflective display panel 410. Furthermore, one of the first portion 320c1 and the second portion 320c2 has the edge portion 322, and the other of the first portion 320c1 and the second portion 320c2 has the light incident surface S. Specifically, in this embodiment, the first portion 320c1 has the edge portion 322, and the second portion 320c2 has the light incident surface S. The first portion 320c1 is disposed between the second portion 320c2 and the first adhesive layer 320a, and the second portion 320c2 is disposed between the first portion 320c1 and the second adhesive layer 320b. In other embodiments (not shown), the refractive index of the first light guide plate 320c may also gradually decrease along the direction of Z-axis of the reflective display panel 410. Correspondingly, in such embodiments, the first portion 320c1 has the light incident surface S, and the second portion 320c2 has the edge portion 322. The invention is not limited thereto.

Referring to FIG. 3B again, in this embodiment, the edge portion 322 has a plurality of first sub-edges 322a and a plurality of second sub-edges 322b. In addition, the first sub-edges 322a and the second edges 322b are in a linear shape, and the second sub-edges 322b are substantially parallel to the edge of the light incident surface S. More specifically, the second sub-edges 322b have the first side S1 and the second side S2 opposite to the first side S1. In addition, the light sources 330 are located at the first side S1, and the first sub-edges 322a are located at the second side S2. More specifically, the first sub-edges 322a are located at the second side S2. Thus, with an indent design of the first sub-edges 322a in this embodiment, one of distances from the first sub-edges 322a to the light incident surface S is greater than one of distances from the second sub-edges 322b to the light incident surface S. In another embodiment, an average of the distances from the first sub-edges 322a to the light incident surface S is greater than an average of the distances from the second sub-edges 322b to the light incident surface S. It should be noted that the shapes of the first sub-edges 322a may also be a V shape or a semi-circular shape as shown in FIG. 1C or 1D. Thus, not further details in this regard will be repeated in the following.

Based on above, in this embodiment, since the refractive index of the first light guide plate 320c gradually increases along the direction of Z-axis of the reflective display panel 410, a refractive index of the second portion 320c2 is greater than a refractive index of the first portion 320c1. The light sources 330 provide incident light beams to be coupled to the first light guide plate 320c through the light incident surface S of the first light guide plate 320c. More specifically, a distance for a portion of the incident light beams provided by the light sources 330 to travel to the first sub-edges 322a through the light incident surface S is greater than a distance for another portion of the incident light beams provided by the light sources 330 to travel to the second sub-edges 322b through the light incident surface S. Thus, compared with the incident light beams that travel from the light incident surface S of the first light guide plate 320c to the second sub-edges 322b, a lower proportion of the incident light beams that travel from the light incident surface S of the first light guide plate 320c to the first sub-edges 322a are refracted to the reflective display panel 410, while a higher proportion of the incident light beams that travel from the light incident surface S of the first light guide plate 320c to the second sub-edges 322b are refracted to the reflective display panel 410. Detailed descriptions in this regard are the same as those in the previous embodiments, and are thus not repeated in the following. In this embodiment, by designing the distance from the edge portion 322 of the first portion 320c1 or the edge portion 322 of the second portion 320c2 of the first light guide plate 320c having a gradient index to the light incident surface S, the uniformity of light intensity of the reflective display panel 210 adjacent to the light incident surface S may also be effectively improved. Thus, with the arrangement, the phenomenon of hot spot of the reflective display panel 410 adjacent to the light incident surface S may also be effectively reduced.

Figure 4A:
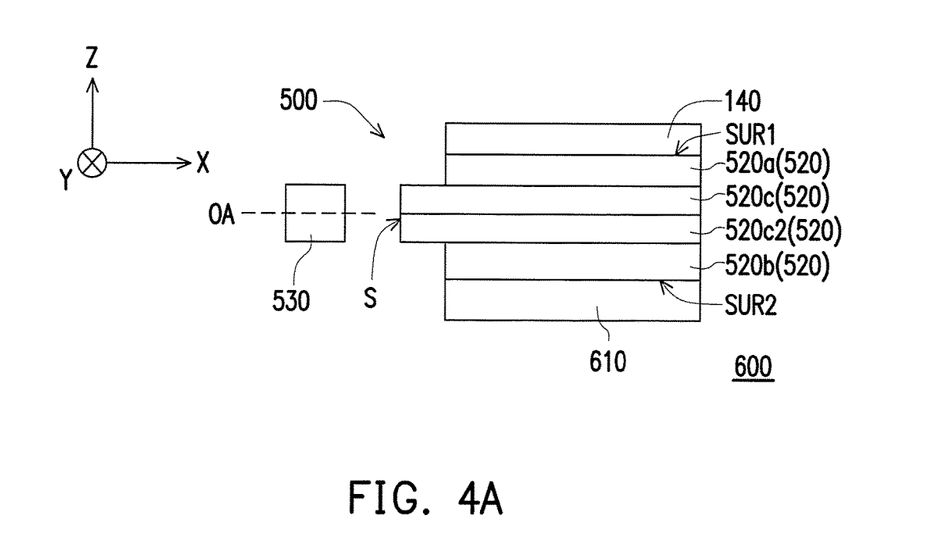
FIG. 4A is a schematic cross-sectional view illustrating a display module of yet another embodiment of the invention.
Figure 4B:
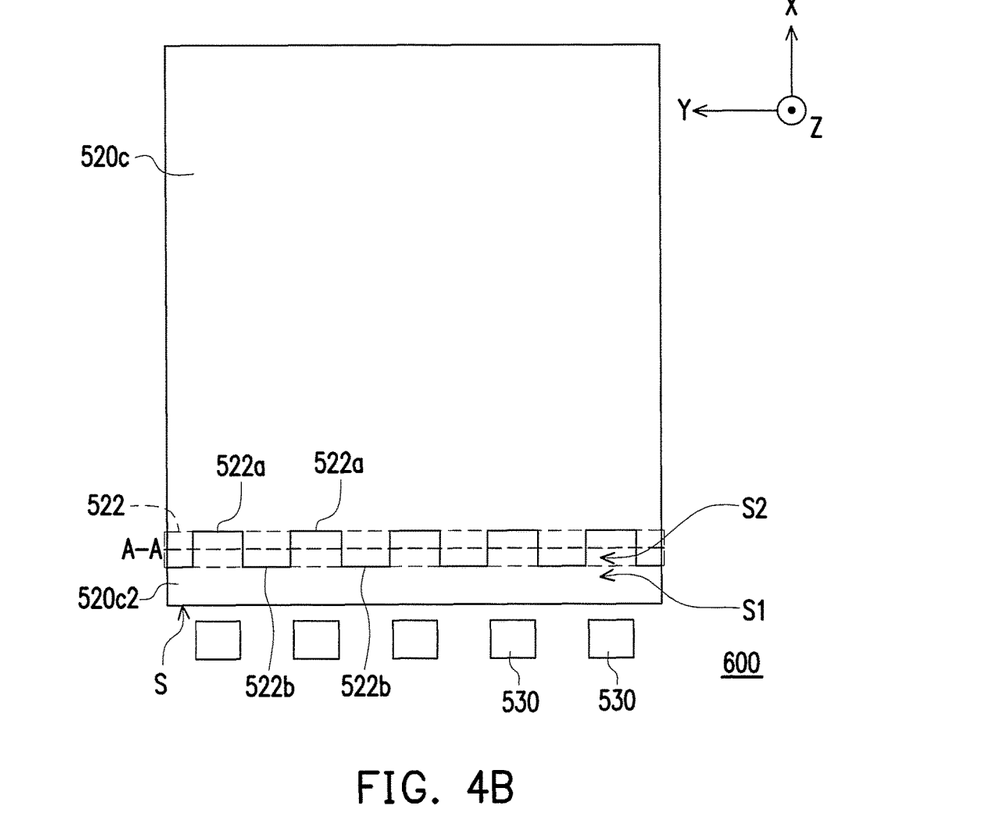
FIG. 4B is a schematic top view illustrating the embodiment shown in FIG. 4A.
Figure 4C:
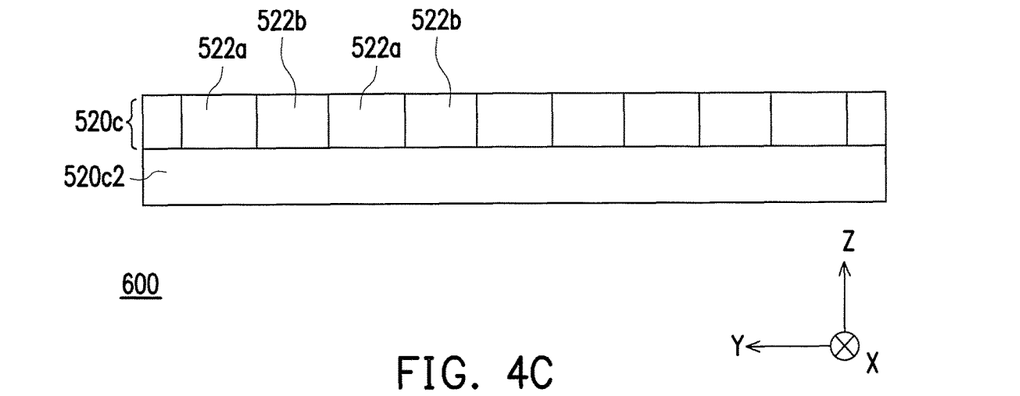
FIG. 4C is a schematic cross-sectional view illustrating the embodiment shown in FIGS. 3A and 3B along line A-A.

FIG. 4A is a schematic cross-sectional view illustrating a display module of yet another embodiment of the invention. FIG. 4B is a schematic top view of the display module shown in FIG. 4A. FIG. 4C is a schematic cross-sectional view illustrating the display module of another embodiment of the invention along line A-A in FIG. 4B. It should be noted that, to more clearly illustrate an arrangement of respective components in a first light guide plate 520c and a second light guide plate 520c2, illustration of a first adhesive layer 520a, a second adhesive layer 520b, the functional layer 140, and a reflective display panel 610 is omitted in FIGS. 4B and 4C.

Referring to FIGS. 4A, 4B, and 4C together, a display module 600 shown in FIGS. 4A, 4B, and 4C are similar to the display module 200 shown in FIGS. 1A and 1B, except for a main difference that the display module 600 further includes the second light guide plate 520c2. In addition, the first light guide plate 520c and the second light guide plate 520c2 have substantially different refractive indices, and the respective refractive indices of the first light guide plate 520c and the second light guide plate 520c2 are constant values. Also, the refractive index of the first light guide plate 520c is smaller than the refractive index of the second light guide plate 520c2. The first light guide plate 520c is located between the first adhesive layer 520a and the second light guide plate 520c2, and the second light guide plate 520c2 is located between the first light guide plate 520c and the second adhesive layer 520b. In other words, the display module 600 has two stacked light guide plates, namely a two-layer laminated light guide plate. One of the first light guide plate 520c and the second light guide plate 520c2 has an edge portion 522, and the other of the first light guide plate 520c and the second light guide plate 520c2 has the light incident surface S. More specifically, in this embodiment, the first light guide plate 520c has the edge portion 522, while the second light guide plate 520c2 has the light incident surface S. In other embodiments, the refractive index of the first light guide plate 520c may also be greater than the refractive index of the second light guide plate

520c2. In such embodiments (not shown), the first light guide plate 520c has the light incident surface S, while the second light guide plate 520c2 has the edge portion 522. However, the invention is not limited thereto.

Referring to FIG. 4B again, in this embodiment, the first light guide plate 520c has the edge portion 522, and the second light guide plate 520c2 has the light incident surface S. In this embodiment, a portion of incident light beams provided by light sources 530 are coupled to the second light guide plate 520c2 through the light incident surface S of the second light guide plate 520c2. Also, first sub-edges 522a and second sub-edges 522b are in a linear shape, and the second sub-edges 522b are substantially parallel to the edge of the light incident surface S. More specifically, the second sub-edges 522b have the first side S1 and the second side S2 opposite to the first side S1. In addition, the light sources 530 are located at the first side S1, and the first sub-edges 522a are located at the second side S2. Thus, with an indent design of the first sub-edges 522a in this embodiment, one of distances from the first sub-edges 522a to the light incident surface S is greater than one of distances from the second sub-edges 522b to the light incident surface S. In another embodiment, an average of the distances from the first sub-edges 522a to the light incident surface S is greater than an average of the distances from the second sub-edges 522b to the light incident surface S. It should be noted that the shapes of the first sub-edges 522a may also be a V shape or a semi-circular shape as shown in FIG. 1C or 1D. Thus, not further details in this regard will be repeated in the following.

Accordingly, in this embodiment, a portion of the incident light beams provided by light sources 530 are coupled to the second light guide plate 520c2 through the light incident surface S of the second light guide plate 520c2. More specifically, a distance for a portion of the incident light beams provided by the light sources 530 to travel to the first sub-edges 522a through the light incident surface S is greater than a distance for another portion of the incident light beams provided by the light sources 530 to travel to the second sub-edges 522b through the light incident surface S. Thus, compared with the incident light beams that travel from the light incident surface S of the second light guide plate 520c2 to the second sub-edges 522b, a lower proportion of the portion of the incident light beams that travel from the light incident surface S of the second light guide plate 520c2 to the first sub-edges 522a are refracted to the reflective display panel 610, while a higher proportion of the incident light beams that travel from the light incident surface S of the second light guide plate 520c2 to the second sub-edges 522b are refracted to the reflective display panel 610. Detailed descriptions in this regard are the same as those in the previous embodiments, and are thus not repeated in the following. In this embodiment, by designing the distance from the edge portion 522 of the first light guide plate 520c or the edge portion 522 of the second light guide plate 520c2 to the light incident surface S, where the first light guide plate 520c and the second light guide plate 520c2 have different refractive indices, the uniformity of light intensity of the reflective display panel 610 adjacent to the light incident surface S may also be effectively improved. Thus, with the arrangement, the phenomenon of hot spot of the reflective display panel 610 adjacent to the light incident surface S may also be effectively reduced.

It should be noted that, while the embodiment is described as having two light guide plates as an example, the display module in other embodiments may have three or more laminated light guide plates, and the invention is not limited by the number of the light guide plates.

In view of the foregoing, the front light module according to the embodiments of the invention reduces the phenomenon of hot spot by designing that the transparent materials have different refractive indices and the distances from the transparent materials to the light incident surface are different. Besides, the front light module according to the embodiments of the invention is also suitable for the light guide plate forming of non-uniform materials, such as the light guide plate having a gradient index or the laminated light guide plate having two or more layers. Thus, a display image of the display module having the front light module according to the embodiments of the invention has a preferable uniformity of light intensity, and the display module has a preferable optical quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A front light module, comprising:
    a plurality of stacked transparent materials, comprising:
        a first surface;
        a second surface, opposite to the first surface; and
        a light incident surface; and
    a plurality of light sources, configured to provide a plurality of light beams and disposed beside the light incident surface, wherein an edge portion is at a location of at least one of the transparent materials that is adjacent to the light sources, one of the transparent materials has the light incident surface, the edge portion comprises a plurality of first sub-edges and a plurality of second sub-edges, the light sources are disposed in alignment with the first sub-edges, and the first sub-edges and the second sub-edges are alternately arranged in a row, wherein a buffer portion of the one of the transparent materials having the light incident surface is exposed to an outside of the front light module by the edge portion, one of distances from the first sub-edges to the light incident surface is defined as a first distance,
    one of distances from the second sub-edges to the light incident surface is defined as a second distance,
    the first distance is larger than the second distance, the first distance and the second distance are larger than zero, and the buffer portion has the first distance and the second distance.

2. The front light module as claimed in claim 1, wherein the transparent materials comprise:
    a first adhesive layer;
    a second adhesive layer, wherein at least one of the first adhesive layer and the second adhesive layer has the edge portion; and
    a first light guide plate located between the first adhesive layer and the second adhesive layer, having the light incident surface.

3. The front light module as claimed in claim 1, wherein the transparent materials comprise:
    a first adhesive layer;
    a second adhesive layer; and
    a first light guide plate located between the first adhesive layer and the second adhesive layer, having a first portion and a second portion, wherein one of the first portion and the second portion has the edge portion, and the other of the first portion and the second portion has the light incident surface,
wherein a refractive index of the first light guide plate is a gradient index.

4. The front light module as claimed in claim 1, wherein the transparent materials comprise:
a first adhesive layer;
a first light guide plate;
a second light guide plate; and
a second adhesive layer, wherein a refractive index of the first light guide plate and a refractive index of the second light guide plate are substantially different from each other, the first light guide plate is located between the first adhesive layer and the second light guide plate, one of the first light guide plate and the second light guide plate has the edge portion, and the other of the first light guide plate and the second light guide plate has the light incident surface.

5. The front light module as claimed in claim 1, wherein an average of the distances from the first sub-edges to the light incident surface is greater than an average of the distances from the second sub-edges to the light incident surface.

6. The front light module as claimed in claim 1, wherein a shape of each of the first sub-edges is a V shape, a semi-circular shape, or a linear shape, and each of the second sub-edges is substantially parallel to the light incident surface.

7. The front light module as claimed in claim 1, wherein the front light module further comprises a functional layer, the functional layer is disposed on the first surface and is an anti-glare layer, a protection layer, or an anti-reflective layer.

8. The front light module as claimed in claim 1, wherein each of the light sources is aligned to one of the first sub-edges in a one-to-one relation.

9. The front light module as claimed in claim 1, wherein the light sources are arranged beside the light incident surface along a line in an equidistant arrangement.

10. The front light module as claimed in claim 2, wherein each of a refractive index of the first adhesive layer and a refractive index of the second adhesive layer is smaller than a refractive index of the first light guide plate.

11. The front light module as claimed in claim 2, wherein materials of the first adhesive layer and the second adhesive layer comprises optical clear adhesive.

12. A display module, comprising:
a reflective display panel;
a plurality of stacked transparent materials, comprising:
a first surface;
a second surface, opposite to the first surface, wherein the second surface faces toward the reflective display panel, and the first surface faces away from the reflective display panel; and
a light incident surface; and
a plurality of light sources, configured to provide a plurality of light beams and disposed beside the light incident surface, wherein an edge portion is at a location of at least one of the transparent materials that is adjacent to the light sources,
one of the transparent materials has the light incident surface,
the edge portion comprises a plurality of first sub-edges and a plurality of second sub-edges, the first sub-edges and the second sub-edges are alternately arranged in a row,
wherein a buffer portion of the one of the transparent materials having the light incident surface is exposed to an outside of the front light module by the edge portion, the light sources are disposed in alignment with the first sub-edges, one of distances from the first sub-edges to the light incident surface is defined as a first distance, one of distances from the second sub-edges to the light incident surface is defined as a second distance,
the first distance is larger than the second distance, and the first distance and the second distance are larger than zero,
and the buffer portion has the first distance and the second distance.

13. The display module as claimed in claim 12, wherein the transparent materials comprise:
a first adhesive layer;
a first light guide plate, having the light incident surface; and
a second adhesive layer, wherein the first light guide plate is located between the first adhesive layer and the second adhesive layer, and at least one of the first adhesive layer and the second adhesive layer has the edge portion.

14. The display module as claimed in claim 12, wherein the transparent materials comprise:
a first adhesive layer;
a second adhesive layer; and
a first light guide plate located between the first adhesive layer and the second adhesive layer, having a first portion and a second portion, and one of the first portion and the second portion has the edge portion, and the other of the first portion and the second portion has the light incident surface,
wherein a refractive index of the first light guide plate is a gradient index.

15. The display module as claimed in claim 12, wherein the transparent materials comprise:
a first adhesive layer;
a first light guide plate;
a second light guide plate; and
a second adhesive layer, wherein a refractive index of the first light guide plate and a refractive index of the second light guide plate are substantially different from each other, the first light guide plate is located between the first adhesive layer and the second light guide plate, the second light guide plate is located between the first light guide plate and the second adhesive layer, one of the first light guide plate and the second light guide plate has the edge portion, and the other of the first light guide plate and the second light guide plate has the light incident surface.

16. The display module as claimed in claim 12, wherein a shape of each of the first sub-edges is a V shape, a semi-circular shape, or a linear shape, and each of the second sub-edges is substantially parallel to the light incident surface.

17. The display module as claimed in claim 12, wherein the front light module further comprises a functional layer, the functional layer is disposed on the first surface and is an anti-glare layer, a protection layer, or an anti-reflective layer.

18. The display module as claimed in claim 12, wherein an average of the distances from the first sub-edges to the light incident surface is greater than an average of the distances from the second sub-edges to the light incident surface.

19. The display module as claimed in claim 13, wherein each of a refractive index of the first adhesive layer and a refractive index of the second adhesive layer is smaller than a refractive index of the first light guide plate.

20. The display module as claimed in claim 13, wherein materials of the first adhesive layer and the second adhesive layer comprise optical clear adhesive.

\* \* \* \* \*